United States Patent Office 3,156,665
Patented Nov. 10, 1964

3,156,665
NON-DUSTING PIGMENT WITH N-ALKYL AND CYCLOALKYL TOLUENE SULFONAMIDE-COATED NYLON MOLDING COMPOSITIONS
Philip Dawson Brossman, Parkersburg, W. Va., and Edward Hector Price, Kennett Square, Pa., assignors to E. I. du Pont de Nemours and Company, Wilmington, Del., a corporation of Delaware
No Drawing. Filed Mar. 6, 1961, Ser. No. 93,340
6 Claims. (Cl. 260—37)

This invention is concerned with novel compositions comprising nylon resins in granular form coated with a binder fluid and a finely-divided pigment, and with a process for preparing an extruded, pigmented molding composition. More particularly, this invention is concerned with nylon resins in the form of molding granules known as "flake," in which the individual granules of the resin are uniformly coated with a heat-stable, finely divided pigment which is caused to adhere to the surfaces of the granules by a liquid N-hydrocarbon-substituted toluenesulfonamide. The novel compositions, comprising resin granules coated uniformly with N-hydrocarbon toluenesulfonamide and pigment, are particularly useful for extrusion and injection-molding processes for the fabrication of superior colored articles from said thermoplastic resins.

It has long been a commercial practice, where it is desired to fabricate colored articles from thermoplastic, semi-crystalline resins, to prepare molding compositions by simply tumbling the resin flake with a finely-divided pigment and then feeding this mixture to the hopper of a suitable fabricating machine such as an extruder or an injection-molding apparatus. This process has been beset with manny difficulties and disadvantages. Thus, these mixtures are very dusty and contaminate equipment and surroundings. This results in color contamination of subsequent mixes employing different pigments. More serious is the fact that this "dusting" results in non-uniformity of the pigment-resin mixtures since the pigment tends to concentrate towards the bottoms of containers and feed-hoppers. A further drawback to this method is that during the mixing process changes occur in the pigments which affect the resultant color and appearance of articles fabricated from the mixtures. On the one hand, certain softer pigments are abraded and broken down to varying extents during the mixing operation. On the other hand, electrostatic charges developed during tumbling of resin granules cause the pigment particles to agglomerate. Thus, the color eventually obtained may be quite variable from batch to batch.

In efforts to overcome, or at least mitigate, the undesirable effects described above, the use of various fluids on the surfaces of the resin granules as "binders" for the pigment has been tried in some cases. However, most of the fluids previously used have not provided a satisfactory solution to the problems already described, and others of the liquids employed have overcome some disadvantages while introducing new problems.

Thus, in the past, high boiling glycols, such as octylene glycol, have been employed as binding agents in the pigmenting of nylon resins. By the use of such materials, "dusting" could be reduced but not eliminated since if enough of such a binding agent were coated onto the molding granules to bind all of the added pigment powder and hence eliminate dusting, the resultant compositions could not be processed since, during any subsequent melting process, excessive foaming occurred, due in part to reaction of the glycol with the nylon and the elimination of water as steam, and, on fabrication, articles with splay marks and voids were formed. Therefore, it was necessary to use these glycol binding agents in proportions insufficient to bind all of the pigment required, with the result that considerable dusting still occurred and uneven coloring of extruded objects was obtained.

A major improvement over these liquid binders employed in the prior art was disclosed in our co-pending application, Serial Number 649,312, filed March 29, 1957, now abandoned. There we disclose that certain silicone oils (polysiloxanes) having boiling points higher than the melting point of the nylon resin are extremely effective as pigment binders when employed at a level of 0.05 to 0.5% by weight. The use of the silicone oils as binders completely eliminates dusting of the pigment and the problem of color alteration by grinding or agglomeration of the pigment particles. However, for certain applications in the electrical and film fields, two quite serious and unexpected shortcomings from the use of silicone oils with nylons have appeared. While natural nylon resin is self-extinguishing when exposed to an open flame, it has been found that the presence of even as little as 0.05% of the silicone oil makes these resins inflammable—that is, once set on fire, they continue to burn when silicone oil is present. Another unexpected deficiency was uncovered when nylon resins containing silicone oils were extruded into thin films; numerous small holes appeared in the nylon films. Apparently, the silicone oils do not dissolve in the molten nylon but rather form an extremely fine dispersion of micro-droplets which, when the nylon is extruded as film, cause the holes to develop.

Therefore, an object of this invention is to provide a granular, non-dusting, pigment-coated, nylon resin suitable for extrusion or for injection molding to provide self-extinguishing shaped articles. Another object of this invention is to provide a pigmented nylon resin composition in which the pigment and binder do not cause foaming when the resin is melted. Still another object of this invention is to provide a pigmented nylon resin which can be injection-molded to produce uniformly colored articles without sticking to the molds and without the formation of voids within the articles or splay marks upon the surface, defects often produced by customary pigmentation processes. A particular object of this invention is to provide a process for preparing and extruding a pigment-coated, non-dusty nylon molding composition which will not, as a result of the pigmentation and binder, foam on melting or result in voids, splay marks, or mold-sticking and which, when extruded, will yield shaped articles which are self-extinguishing. Other objects and advantages of this invention will become apparent from the description which follows.

In accordance with this invention it has been discovered that the objects hereinabove stated can be achieved by providing a nylon molding composition which comprises a nylon resin in granular form in which the granules are uniformly coated with from 0.1% to 1.0% by weight of a finely divided, heat-stable pigment and with from 0.05% to 0.5% by weight of an N-hydrocarbon toluenesulfonamide chosen from at least one member of the group consisting of ortho- and para-N-alkyl-toluenesulfonamides and ortho- and para-N-cycloalkyltoluenesulfonamides, and by providing a process for coloring a nylon molding resin in granular form which comprises tumbling the nylon granules with from 0.05 to 0.5% by weight of a liquid binder selected from at least one member of the group consisting of ortho- and para-N-alkyltoluene-sulfonamides and ortho- and para-N-cycloalkyltoluenesulfonamides, and with from 0.1 to 1.0% by weight of a heat-stable, finely-divided pigment, and subsequently feeding the pigment-coated nylon molding granules to an extruder, extruding a ribbon of pigmented nylon, and cutting the ribbon to provide colored molding granules which are self-extinguishing.

The use of the novel compositions of this invention for extrusion or injection molding of colored articles from thermoplastic crystalline resins has been found to result in a number of significant advantages with respect both to improved processing behavior and to improved appearance of the fabricated articles. This rather surprising combination of advantages cannot, so far as is now known to those skilled in the art, be achieved in any other way. Thus the N-alkyl and N-cycloalkyltoluenesulfonamides have been found to cause the pigments to adhere to the resin granules more effectively, on a weight basis, than formerly known materials, other than silicone oils, which can be used for this purpose. Furthermore, these toluenesulfonamides can be employed at concentrations, based on the resin, which are high enough to bind substantially all of the pigment, and hence effectively eliminate "dusting" of the pigment, without causing any foaming of the molten resins and without producing undesirable surface splaying on the articles fabricated from these novel compositions. Elimination of "dusting" greatly simplifies clean-up procedures when changing colors and reduces significantly the amount of off-color product obtained after a change-over to a new colored composition. The presence of these toluenesulfonamides substantially reduces the color change of the pigmenst which is commonly observed during dry-blending of many pigments with nylon molding resins. In the absence of these toluenesulfonamides, some color changes are observed on tumbling resin granules with pigment; these changes are due to agglomeration of pigment particles, ordinarily ascribed to electrostatic charges produced during tumbling. With the use of 0.05% to 0.5 N-substituted toluenesulfonamides, the agglomeration is essentially eliminated. As a result, articles fabricated from these compositions by injection molding appear more brilliant and are more uniform in color from batch to batch. Color uniformity within a single batch is better when N-alkyl or N-cycloalkyltoluenesulfonamides are employed as binding agents than when most other binders are used since a more uniform distribution of the pigment over the surfaces of the thermoplastic resin granules may be obtained. Most importantly, in contrast the silicone oils, these N-alkyl- and N-cycloalkyltoluene sulfonamides are soluble in molten nylon, and their presence enhances the self-extinguishing property of nylon rather than destroying it.

The nylon resins employed in this invention are the well-known superpolycarboxylamides in which the amide linkages form an integral part of the polymer chains. Such nylons are prepared by the reaction of equimolar portions of a dicarboxylic acid and a diamine with the elimination of water or by the polymerization of omega-aminocarboxylic acids, particularly caprolactam. Polyhexamethyleneadipamide, obtained from the condensation polymerization of equal molar proportions of hexamethylene diamine and adipic acid, and polyhexamethylenesebacamide, obtained from the condensation polymerization of hexamethylenediamine and sebacic acid, are particularly suitable nylons. The degree of polymerization is such as to give a polymer having an intrinsic viscosity of at least 0.6 dl./g. The molding granules, or "flake," are suitably prepared by the melt extrusion of a ribbon which then is cut, suitably to give granules averaging about ⅛ inch by ⅛ inch by ³⁄₁₆ inch.

The binder liquids employed in this invention are the N-substituted toluenesulfonamides, either the ortho or para isomers, or a mixture. These are represented by the structural formulae:

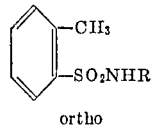
ortho

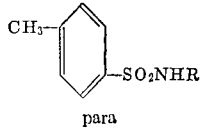
para where R is an alkyl or cycloalkyl group. Typical alkyl groups suitable are methyl, ethyl, propyl, butyl, isobutyl, pentyl, hexyl, decyl, etc. The usual cycloalkyl groups are cyclohexyl and cyclopentyl, although substituted groups such as methylcyclohexyl are suitable. Preferably this hydrocarbon group substituted on the nitrogen should contain from two to six carbon atoms. A particularly suitable binder liquid is the mixture of ortho- and para-N-ethyl-toluenesulfonamides sold under the trade name "Santicizer 8" by Monsanto Chemical Company. It is noteworthy that these toluenesulfonamides, which have sometimes been used in the past as plasticizers—additives which soften plastics—do not produce any measurable plasticization of the nylons at the levels employed in the subject invention. That is, the hardness, tensile, and elastic properties of the nylons are not affected.

The concentration of pigment employed in these novel compositions is a function of the particular pigment used and of the intensity of color desired. Generally, at least 0.1% by weight is needed to give the desired intensity of color. The effective coloring power of the pigments is also a function of the color, crystallinity, and spherulite structure of the particular nylon employed. The maximum amount of pigment which is employed in the compositions of this invention depends in part upon the intensity of color desired, but it is limited by the amount which can be adhered to the surfaces of the resin granules; this is primarily a function of the surface-to-volume ratio of the resin granules. Generally, this maximum is about 2% by weight, but in the case of nylon resins, it is preferable to limit the proportion of pigment to about 0.5% by weight, although higher concentrations can be successfully processed.

The proportion of the N-alkyl or N-cycloalkyltoluenesulfonamide binder which may be employed in the novel molding compositions of this invention is controlled by somewhat different facts. It has been found that at least 0.05% by weight must be employed to obtain uniform distribution of the pigment particles and to significantaly reduce "dusting"; however, it is preferable to use from 0.1 to 0.3% by weight of this binder liquid in order to eliminate "dusting" altogether and to obtain optimum performance of these molding compositions in extrusion and injection molding operations. More than 0.5% by weight of the N-substituted toluenesulfonamides cannot be tolerated since large proportions result in excessive slippage of the resin in extrusion screws and produce surface blemishes and other defects in the articles fabricated therefrom.

This invention is further illustrated and explained by the following examples which describe the preparation and use of a number of pigment-coated nylon molding resins.

EXAMPLE 1

In this example, 15 pound batches of a polyhexamethyleneadipamide nylon flake (manufactured by E. I. du Pont de Nemours and Company) were blended with pigments according to the following procedure: Each batch of nylon was placed in a small drum under dry $N_2$ atmosphere and 13.5 g. (0.2% by weight) of a binder liquid was added, the drum closed, then tumbled for 10 minutes; the drum then was opened and pigment added, flushed with dry $N_2$, the drum closed, then again tumbled for 10 minutes to distribute the pigment evenly over the surfaces of the nylon granules. The drum then was opened and the contents poured into a wide-mouthed glass bottle. Any tendency to dustiness was noted.

Subsequently, each batch of pigment-coated nylon was extruded by feeding the pigment-coated granules to the hopper of an extruder operating at 285° to 300° C. and extruded, using 20 mesh screen, through a ribbon die; the ⅛ x ³⁄₁₆ inch ribbon was examined for appearance and cut up into ⅛ inch lengths. A portion of the uncut ribbon was tested for flammability to determine whether or not it was self-extinguishing. These experiments are tabulated in Table I.

TABLE I

*Preparation of Pigment-Coated Nylon Molding Granules (15 Lb.-Batches)*

| Run No. | Binder Liquid | Wt. (g.) | Percent | Pigment | Wt. (g.) | Percent | Dustiness | Extrudate Appearance | Flammability |
|---|---|---|---|---|---|---|---|---|---|
| 1 | "Santicizer 8" [1] | 13.5 | 0.2 | Gold Bronze / Aluminum Bronze | 66.1 / 2.0 | 1.0 | None | Good | Self-extinguishing. |
| 2 | "DC-200" [2] | 13.5 | 0.2 | Gold Bronze / Aluminum Bronze | 66.1 / 2.0 | 1.0 | do | do | Supports flame. |
| 3 | Octylene glycol | 13.5 | 0.2 | Gold Bronze / Aluminum Bronze | 66.1 / 2.0 | 1.0 | Somewhat dusty | Splay marks | Self-extinguishing. |
| 4 | None | 0 | 0 | Gold Bronze / Aluminum Bronze | 66.1 / 2.0 | 1.0 | Very dusty | Variable color | Do. |
| 5 | "Santicizer 8" [1] | 13.5 | 0.2 | None | 0 | 0 | None | Good | Do. |
| 6 | "DC-200" [2] | 13.5 | 0.2 | do | 0 | 0 | do | do | Supports flame. |

[1] Mixture of ortho- and para-N-ethyltoluenesulfonamide, Monsanto Chemical Company.
[2] Silicone oil; dimethylpolysiloxane, Dow Corning Company (Dow Corning Silicone Notebook, Reference No. 2003).

The six runs listed in Table I include a control (Run 4) in which no binder was employed, and a comparison of the N-substituted toluenesulfonamides with silicone oil (Runs 2 and 6) and with octylene glycol, a typical fluid customarily employed in the past to mitigate, without eliminating, dusting. Other experiments, similar to Run 1 but in which the N-ethyltoluenesulfonamide was replaced by N-butyltoluenesulfonamide and N-cyclohexyltoluenesulfonamide, gave comparable results. Similarly, comparable results were achieved when the bronze pigments were replaced by a titanium dioxide white, a cadmium yellow, a cadmium orange, or a cadmium red.

The above experiments clearly show the superior results achieved by the use of N-hydrocarbon substituted toluenesulfonamides as compared with the practice of the prior art. These substituted toluenesulfonamides are as effective as the silicone oils in binding pigments to the surfaces of nylon molding granules and preventing dusting and color change, and they have the important and completely unexpected advantage of producing a pigmented nylon extrudate which will not support a flame.

EXAMPLE 2

In this example, 500-pound batches of polyhexamethyleneadipamide nylon ("natural flake") in the form of standard molding granules approximately ⅛ inch by ⅛ inch by 3/16 inch were charged into a blender of the double cone type which rotates on an axis perpendicular to the major axis of the cones. The cone was filled previously with a dry atmosphere because of the tendency of nylon resins to absorb moisture. Then 0.5 pound (0.1% by weight) of an N-substituted toluenesulfonamide was sprinkled over the surface of the granules, the blender lid was closed, and the contents tumbled for fifteen minutes at about 30 r.p.m. to distribute the oil uniformly over the flake.

The rotation was then interrupted, the pigment added, and the contents subsequently tumbled for another fifteen minutes to distribute the pigment evenly over the surfaces of the nylon flake. On discharge of the contents of the blender into drums, no dusting of the pigments was observed.

Subsequently, the pigment-coated granules were extruded into ribbon, with the extruder operated at 300° C. and the die at 222° C., and the pigmented ribbon cut up into the standard molding flake and canned under a dry atmosphere. Table II lists the runs made under these conditions. Subsequently, these pigmented flakes were extruded as a coating on #20 copper wire. The coated wires passed the Underwriters' Laboratory test for inflammability of coating for use in electrical applications while wires coated with pigmented nylon in which a silicone oil had been used as binder failed in every case, even when as little as 0.01% silicone oil (insufficient to prevent dusting) had been used.

TABLE II

*Preparation of Pigmented Nylon (Polyhexamethyleneadipamide) Flake for Wire Coating (500-Lb. Batches)*

| Run No. | Binder | Wt. (lb.) | Pigment | Wt. (lb.) |
|---|---|---|---|---|
| 7 | "Santicize 8" [1] | 0.5 | YL-02 [2] | 2.65 |
| 8 | do | 0.5 | PK-09 [3] | 1.57 |
| 9 | do | 0.5 | BL-04 [4] | 2.10 |
| 10 | do | 0.5 | RD-23 [5] | 4.90 |
| 11 | do | 0.5 | BZ-10 [6] | 5.00 |
| 12 | do | 0.5 | WT-17 [7] | 3.32 |
| 13 | do | 0.5 | GN-07 [8] | 3.54 |
| 14 | N-cyclohexyltoluenesulfonamide. | 0.5 | WT-17 [7] | 3.32 |

[1] Ortho- and para-N-ethyltoluenesulfonamide.
[2] Mixture of 19 parts cadmium sulfide yellow, 12 parts cadmium orange, 0.4 part carbon black, and 208.6 parts titanium dioxide white pigment.
[3] Mixture of 12.8 parts titanium dioxide white pigment and 1.4 parts of a cadmium sulfoselenide dark red pigment.
[4] Mixture of 11.6 parts titanium dioxide white pigment and 7.4 parts of a blue cobalt silicate pigment.
[5] Mixture of 25 parts of a cadmium sulfoselenide dark red pigment, 5 parts of a cadmium sulfoselenide orange-red pigment, 13.3 parts of a dark red anthraquinone dyestuff, and 0.1 part of an inorganic black (copper and chromium oxides, fused and ground).
[6] A 100% flake metallic (copper alloy) pigment sold by B. F. Drakenfield & Company—"Finest Palegold Lining Bronze."
[7] A mixture of 300 parts of a titanium dioxide white pigment, 0.7 part of a brown ferric oxide pigment ("Turkey Burnt Umber," Smith Color and Chemical Company) and 0.2 part of a cadmium sulfoselenide dark red pigment.
[8] A mixture of 11.0 parts of ultramarine blue, 13.2 parts extruded cadmium sulfide yellow, lithopone type (Glidden Company), 2.5 parts of an inorganic black (copper and chromium oxides, fused and ground), and 5.3 parts of a cadmium sulfoselenide dark red pigment.

The above examples are illustrative only and are not intended to limit the scope of the invention. It should be obvious to anyone skilled in the art of plastic processing that various methods of mixing the ingredients may be employed, as long as the final products obtained have been sufficiently blended to obtain uniform distribution of the pigment and N-hydrocarbon toluenesulfonamide binder over the surfaces of the resin granules. Likewise the particular pigments employed in the examples are not a limiting feature of the invention. Almost any pigment in a finely-divided form which is heat-stable at the temperatures where the resin is to be processed and which is not siliceous in nature may be employed. While the invention has been illustrated in the examples principally by reference to high-molecular weight polyhexamethylene adipamide resin, many other high-melting, semi-crystalline superpolyamides may be employed including polyhexamethylene sebacamide and polycaprolactam.

This invention has important commercial utility in that for the first time it has made possible the production of a series of pigmented nylons which can be extruded into wire coverings, uniform in color and free from voids and splay marks which do not support a flame. Thus, this invention now has commercial utility in the production of high quality nylon-coated wires in a range of uniform colors, which coatings pass the flammability test of the Underwriters Laboratory, making the coated wires suitable for use in electrical applications.

We claim:

1. A nylon molding resin in coarse granular form in which the granules are uniformly coated with from 0.1 to 1.0% by weight of a heat-stable finely-divided pigment bound to the surfaces of the nylon granules by a uniform coating of from 0.05 to 0.5% by weight, based on the nylon, of a liquid binder selected from at least one member of the group consisting of ortho- and para-N-alkyl toluenesulfonamides and ortho- and para-N-cycloalkyl toluenesulfonamides, said N-alkyl radical having from 1 to 10 carbon atoms and said N-cycloalkyl radical being selected from the group consisting of N-cyclopentyl, N-cyclohexyl, and N-methylcyclohexyl, and the aforesaid nylon molding resin comprising a linear superpolycarboxylamide in which the amide linkages form an integral part of the polymer chains.

2. A composition of claim 1 in which the nylon molding resin is polyhexamethyleneadipamide.

3. A composition of claim 1 in which the liquid binder is a mixture of ortho- and para-N-ethyltoluenesulfonamides.

4. A process for coloring a nylon molding resin, said nylon molding resin comprising a linear superpolycarboxylamide in which the amide linkages form an integral part of the polymer chains, in coarse granular form which comprises tumbling the nylon granules with from 0.05 to 0.5% by weight of a liquid binder selected from at least one member of the group consisting of ortho- and para-N-alkyltoluenesulfonamides and ortho- and para-N-cycloalkyltoluenesulfonamides, said N-alkyl radical having from 1 to 10 carbon atoms and said N-cycloalkyl radical being selected from the group consisting of N-cyclopentyl, N-cyclohexyl, and N-methylcyclohexyl, and with from 0.1 to 1.0% by weight of a heat stable finely-divided pigment, and subsequently feeding the pigment-coated coated nylon molding granules to an extruder, extruding a ribbon of pigmented nylon and cutting the ribbon to provide colored molding granules which are self-extinguishing.

5. A process according to claim 4 in which the nylon molding resin is polyhexamethyleneadipamide.

6. A process according to claim 5 in which the liquid binder is a mixture of ortho- and para-N-ethyltoluenesulfonamides.

References Cited in the file of this patent

UNITED STATES PATENTS

| | | |
|---|---|---|
| 2,214,405 | Coffman | Sept. 10, 1940 |
| 2,948,698 | Cocci | Aug. 9, 1960 |
| 2,996,466 | Kessler et al. | Aug. 15, 1961 |

FOREIGN PATENTS

| | | |
|---|---|---|
| 730,600 | Great Britain | May 25, 1955 |